US 12,286,145 B2

(12) United States Patent
Mathur et al.

(10) Patent No.: US 12,286,145 B2
(45) Date of Patent: Apr. 29, 2025

(54) VEHICLE CONTROL SYSTEM

(71) Applicant: Transportation IP Holdings, LLC, Norwalk, CT (US)

(72) Inventors: Ankit Mathur, Bengaluru (IN); Milan Karunaratne, Orange, CA (US); Anthony D. Paul, Anchorage, AK (US); Jeremiah Dirnberger, Jacksonville, FL (US)

(73) Assignee: Transportation IP Holdings, LLC, Norwalk, CT (US)

( * ) Notice: Subject to any disclaimer, the term of this patent is extended or adjusted under 35 U.S.C. 154(b) by 969 days.

(21) Appl. No.: 17/221,039

(22) Filed: Apr. 2, 2021

(65) Prior Publication Data

US 2022/0315074 A1    Oct. 6, 2022

(51) Int. Cl.
*B61L 25/00* (2006.01)
*B61L 1/16* (2006.01)
(Continued)

(52) U.S. Cl.
CPC ............. *B61L 25/028* (2013.01); *B61L 1/163* (2013.01); *B61L 1/166* (2013.01); *B61L 25/021* (2013.01);
(Continued)

(58) Field of Classification Search
CPC .... B61L 25/028; B61L 25/021; B61L 25/025; B61L 25/00; B61L 1/166; B61L 1/163;
(Continued)

(56) References Cited

U.S. PATENT DOCUMENTS 4,876,597 A * 10/1989 Roy ...................... B61L 25/041
375/E7.206
5,825,177 A * 10/1998 Finnestad ............... G01P 3/803
324/179
(Continued)

FOREIGN PATENT DOCUMENTS

FR            3096952 A1 * 12/2020 .............. B61L 25/04
WO    WO-2009076182 A1 *  6/2009 ......... G06F 18/2321
(Continued)

OTHER PUBLICATIONS

Combined Search and Examination Report received for related UK Patent Application No. GB2204498.6 dated Sep. 30, 2022 (10 pages).
(Continued)

*Primary Examiner* — Zachary L Kuhfuss
*Assistant Examiner* — James William Jones
(74) *Attorney, Agent, or Firm* — K&L Gates LLP (57) ABSTRACT

A control system is provided that may include a first sensor configured to detect a vehicle system. The control system may also include one or more processors in communication with the first sensor. The one or more processors may be configured to receive communication related to entry of the vehicle system into an area, and operate the first sensor to begin monitoring the vehicle system in response to entry of vehicle system into the area. The one or more processors may also be configured to record movement data related to the vehicle system, and determine movement of the vehicle system within the area based on the movement data.

20 Claims, 3 Drawing Sheets

(51) Int. Cl.
  *B61L 25/02* (2006.01)
  *B61L 27/40* (2022.01)
  *B61L 27/70* (2022.01)
  *B61L 17/02* (2006.01)
  *G06V 20/54* (2022.01)
  *G07C 5/08* (2006.01)
(52) U.S. Cl.
  CPC .............. *B61L 27/40* (2022.01); *B61L 27/70* (2022.01); *B61L 17/02* (2013.01); *B61L 2205/04* (2013.01); *G06V 20/54* (2022.01); *G07C 5/0825* (2013.01); *G07C 5/0866* (2013.01)
(58) Field of Classification Search
  CPC ...... B61L 27/40; B61L 27/70; B61L 2205/04; B61L 17/02; G07C 5/0866; G07C 5/0825; G06V 20/54; H04N 23/695
  USPC ...................................................... 246/122 R
  See application file for complete search history.

(56) References Cited

U.S. PATENT DOCUMENTS

| | | | |
|---|---|---|---|
| 7,714,886 B2 | 5/2010 | Kilian et al. | |
| 10,044,936 B2 * | 8/2018 | Ryu | .................... H04N 23/6812 |
| 10,559,200 B1 * | 2/2020 | Langley | ................ G06F 1/3296 |
| 10,822,007 B2 | 11/2020 | Cooper et al. | |
| 10,848,719 B2 * | 11/2020 | Correnti | ............. G08B 13/1965 |
| 2005/0027435 A1 * | 2/2005 | Scheppmann | ......... G06Q 10/08 |
| | | | 701/117 |
| 2007/0040070 A1 * | 2/2007 | Stevenson | ............... B61L 29/30 |
| | | | 246/122 R |
| 2010/0322465 A1 | 12/2010 | Wesche et al. | |
| 2015/0269444 A1 * | 9/2015 | Lameyre | ................ G08G 1/015 |
| | | | 382/104 |
| 2016/0155328 A1 * | 6/2016 | Bernal | ..................... G08G 1/04 |
| | | | 382/104 |
| 2017/0019574 A1 * | 1/2017 | Yang | .................... H04N 23/695 |
| 2018/0247505 A1 * | 8/2018 | Arai | ...................... G06V 40/10 |
| 2019/0373218 A1 * | 12/2019 | Nasu | ......................... G06T 7/70 |
| 2020/0074575 A1 | 3/2020 | Efird et al. | |
| 2020/0086900 A1 * | 3/2020 | de Albuquerque Gleizer | ............ B61L 15/0058 |
| 2020/0255141 A1 | 8/2020 | Lavie et al. | |
| 2021/0107540 A1 * | 4/2021 | Lucas | .................. G08G 1/0116 |
| 2022/0297688 A1 * | 9/2022 | Park | ...................... G01S 15/931 |

FOREIGN PATENT DOCUMENTS

| | | | | |
|---|---|---|---|---|
| WO | 2010087346 | | 8/2010 | |
| WO | WO-2016151925 A1 * | 9/2016 | | ........... G01S 3/7864 |
| WO | WO-2018007084 A1 * | 1/2018 | | .......... B61L 15/0054 |
| WO | WO-2020103754 A1 * | 5/2020 | | ......... G06K 9/00671 |

OTHER PUBLICATIONS

First Examination Report received for related Indian Patent Application No. 202214016040 dated Jan. 9, 2023 (6 pages).
Examination Report received for related GB Patent Application No. 2204498.6 dated Jun. 7, 2023 (6 pages).

* cited by examiner

VEHICLE CONTROL SYSTEM

BACKGROUND

Technical Field

The subject matter described relates to control systems and methods that monitor vehicle systems.

Discussion of Art

Vehicles that are part of a fleet, or operate to carry cargo or passengers, typically have common locations or areas where many of the vehicles are located at the same time. For example, airplanes congregate at an airport, ships at a dock, automobiles at parking garages, rail vehicles at a yard or depot, etc. For some of these vehicles, such as airplanes, ships, rail vehicles, etc. the vehicle can remain at the location for an extended period of time, including days or even weeks. For example, for rail vehicles, one common area is a rail yard. In a rail yard, the rail vehicles load and unload cargo, obtain maintenance, exchange cars, or the like.

To best optimize yard operations, rail vehicle movements with the yard can be observed and logged. Specifically, a group of trained professionals are tasked with watching the movements of the rail vehicles each day the rail vehicles are in the yard. Such a process is lengthy, time consuming, and inefficient. Additionally, the process is subject to human error, movements of vehicles occurring during a time the professional is not in the yard, miscommunications, or the like.

BRIEF DESCRIPTION

In one or more embodiments, a control system is provided that may include a first sensor configured to detect a vehicle system. The control system may also include one or more processors in communication with the first sensor. The one or more processors may be configured to receive communication related to entry of the vehicle system into an area, and operate the first sensor to begin monitoring the vehicle system in response to entry of vehicle system into the area. The one or more processors may also be configured to record movement data related to the vehicle system, and determine movement of the vehicle system within the area based on the movement data.

In one or more embodiments, a method is provided that may include receiving, at a transceiver, location data related to a vehicle system into an area. The method may also include detecting, within a first sensor field of view of a first sensor, a first movement characteristic of the vehicle system on a first route in response to receiving the location data. The method may also include varying the first sensor field of view of the first sensor based on the first movement characteristic detected, and recording, in a storage device, movement data related to the vehicle system obtained from the first sensor.

In one or more embodiments, a control system is provided and may include a camera configured to detect a vehicle system and two or more routes, and a controller including one or more processors in communication with the camera. The one or more processors may be configured to receive communication related to location data of the vehicle system, and operate the camera to begin monitoring at least one of the vehicle system or the two or more routes in response to receiving the communication related to the location data of the vehicle system. The one or more processors may also be configured to log data related to the vehicle system or the two or more routes, and communicate the data logged related to the vehicle system and the two or more routes.

BRIEF DESCRIPTION OF THE DRAWINGS

The inventive subject matter may be understood from reading the following description of non-limiting embodiments, with reference to the attached drawings, wherein below.

DETAILED DESCRIPTION

Embodiments of the subject matter described herein relate to a control system that monitors locations and/or movement of vehicles within an area related to a vehicle such as a rail vehicle. The dimensions of the area can be identified by the control system upon receiving location data, such as global navigation satellite system (GNSS) coordinates from a vehicle. Optionally, the dimensions of the area can be predetermined or based on manual input. The control system utilizes sensors, such as cameras or other optical sensors, to provide data (e.g., video feeds, recorded videos, infrared data, etc.) of the area. The sensors can be placed at different locations to capture activity, including movement data, within the area. One or more of the sensors may dynamically vary the field of view of the sensor to track each vehicle within the area. This includes movement of the sensor through rotation, translation, pitch, yaw, etc. of the sensor, varying a lens or zoom of a sensor, etc. Such dynamic variance may be based on the movement data, entry of the vehicle system into the area, movement data of another vehicle in the area, or the like. In this manner, each sensor may have a different monitoring zone than one or more (or all) other sensors, and be operated to work together with the other sensors to provide movement data related to the entire area. For example, each sensor can monitor a different portion of the area, and the data output by several of the sensors can be combined (e.g., stitched together) to monitor the entire area even in situations where a single sensor does not or is incapable of monitoring the entire area. The movement data of each vehicle in the area can be recorded, or logged to be utilized in determining future movements of each vehicle in the area, and for future vehicles that will enter the area. Such determinations facilitate functionality within the area, and improve efficiencies.

Not all embodiments described herein are limited to rail vehicle systems. For example, one or more embodiments of the control systems and methods described herein can be used in connection with other types of vehicles, such as automobiles, trucks, buses, mining vehicles, marine vessels, aircraft, agricultural vehicles, forklifts, or the like.

Figure 1:
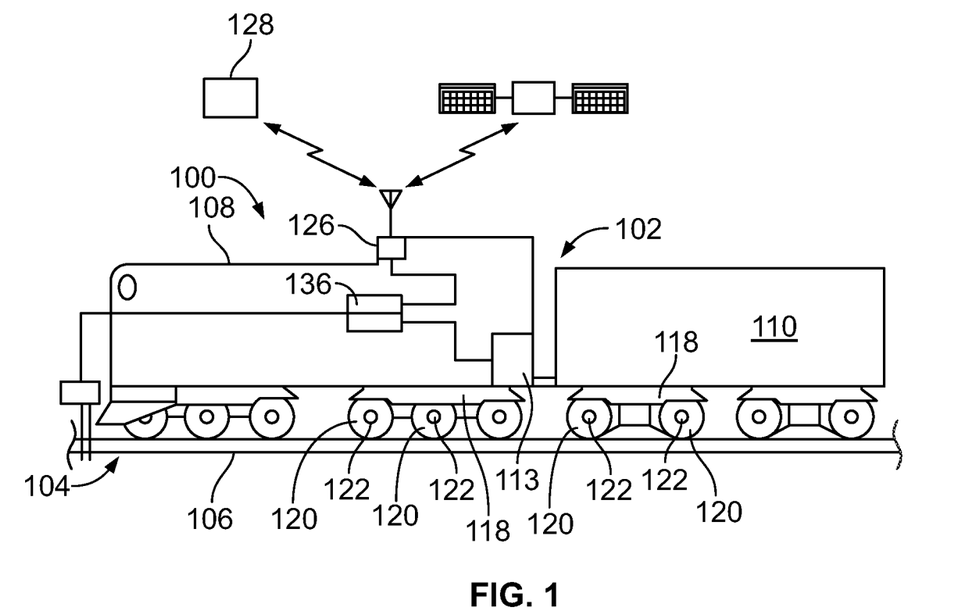
FIG. 1 illustrates a block schematic diagram of a vehicle system.

FIG. 1 illustrates a schematic diagram of one example of a vehicle system 100 that includes a control system 102. The vehicle system may be configured to travel along a route 104 on a trip from a starting or departure location to a destination or arrival location. The vehicle system includes a propulsion-generating vehicle 108 and a non-propulsion-generating vehicle 110 that are mechanically interconnected to one another to travel together along the route. The vehicle system may include at least one propulsion-generating vehicle and optionally, one or more non-propulsion-generating vehicles. Alternatively, the vehicle system may be formed of only a single propulsion-generating vehicle.

The propulsion-generating vehicle may generate tractive efforts to propel (for example, pull or push) the vehicle system along routes. The propulsion-generating vehicle includes a propulsion subsystem, such as an engine, one or more traction motors, and/or the like, that operate to generate tractive effort to propel the vehicle system. The propulsion-generating vehicle also includes a braking system 112 that generates braking effort to slow or stop movement of the vehicle system. Although one propulsion-generating vehicle and one non-propulsion-generating vehicle are shown in FIG. 1, the vehicle system may include multiple propulsion-generating vehicles and/or multiple non-propulsion-generating vehicles. In an alternative embodiment, the vehicle system only includes the propulsion-generating vehicle such that the propulsion-generating vehicle is not coupled to the non-propulsion-generating vehicle or another kind of vehicle. In yet another embodiment, the vehicles in the vehicle system are logically or virtually coupled together, but not mechanically coupled together.

In the example of FIG. 1, the vehicles of the vehicle system each include multiple wheels 120 that engage the route and at least one axle 122 that couples left and right wheels together (only the left wheels are shown in FIG. 1). Optionally, the wheels and axles are located on one or more trucks or bogies 118. Optionally, the trucks may be fixed-axle trucks, such that the wheels are rotationally fixed to the axles, so the left wheel rotates the same speed, amount, and at the same times as the right wheel. In one embodiment, the vehicle system may not include axles, such as in some mining vehicles, electric vehicles, etc.

The control system may further include a wireless communication system 126 that allows wireless communications between vehicles in the vehicle system and/or with remote locations, such as the remote (e.g., dispatch) location 128. The communication system may include a receiver and a transmitter, or a transceiver that performs both receiving and transmitting functions. The communication system may also include an antenna and associated circuitry.

The vehicle system may also include a locator device 136. The locator device may be positioned on the vehicle system, utilize wayside devices, etc. In one example, the locator device is a GNSS receiver, such as a global positioning system (GPS) receiver that receives signals from remote sources (e.g., satellites) for use in determining locations, movements, headings, speeds, etc., of the vehicles, and can provide position data related to the vehicle system. Alternatively, the locator device may use WiFi, Bluetooth-enabled beacons, near-field communication (NFC), radio frequency identification (RFID), QR code, etc. to provide location information.

Figure 2:
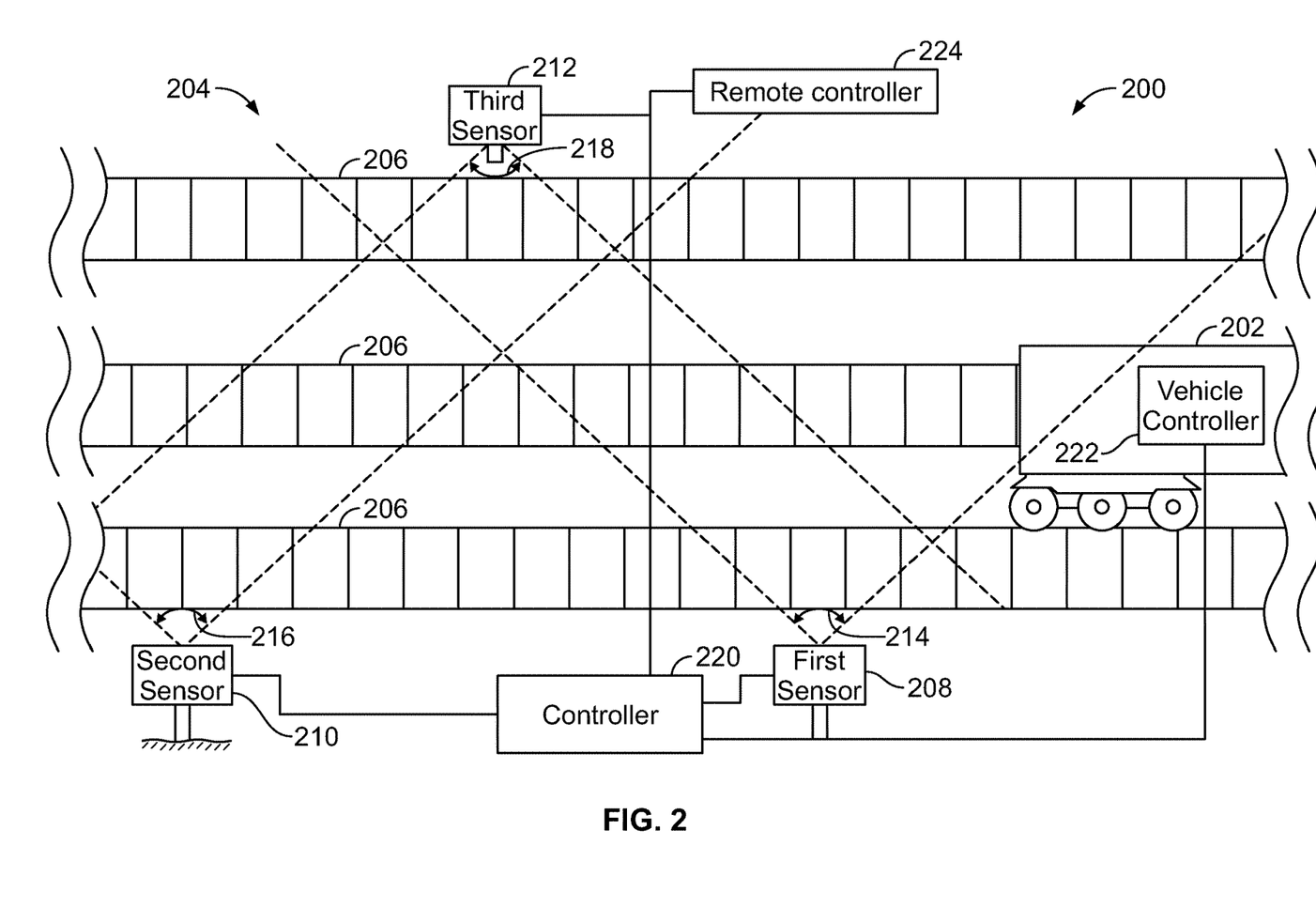
FIG. 2 illustrates a schematic view of a control system within an area.

FIG. 2 provides a schematic illustration of a control system 200 utilized to monitor and determine movement of a vehicle system 202 in an area 204. In one example, the vehicle system is the vehicle system described in FIG. 1. The area in one embodiment may be a rail vehicle yard that receives and manages a plurality of rail vehicles. Alternatively, the area may be an airport, harbor, loading dock, automobile dealership, parking garages, parking lot, warehouse, etc., where numerous vehicles or vehicle systems are provided for stopping, loading, unloading, parking, storing, or the like. The area may include one or more routes 206 that may be traversed by the vehicle system 202. The one or more routes may include tracks, railways, roadways, waterways, runways, paths, or the like.

Within the area are a first sensor 208, a second sensor 210, and third sensor 212. While three sensors are illustrated, this is for illustration purposes only. In other embodiments, ten sensors, twenty sensors, or more may be provided for the area. In one example, each sensor is an optical sensor. Such an optical sensor may be a digital camera, infrared camera, etc. The sensor may take still photos, have a continuously operating video feed, etc.

Each sensor has a field of view. In this manner, the first sensor has a first sensor field of view 214, the second sensor has a second sensor field of view 216, and the third sensor has a third sensor field of view 218. Each sensor may also vary its individual field of view. Such variance may be accomplished through movement or rotation of the sensor, including having a static sensor that does not rotate or move and merely always has the same field of view, or a sensor that is able to rotate 360° but does not move otherwise. Alternatively, the sensors may rotate, and be able to move otherwise. In another embodiment, the field of view may vary based on functioning within the sensor, such as by changing zoom or magnification of the sensor, an aperture or f-stop of the sensor, etc.

Each sensor may vary the field of view to capture data related to the vehicle system. In one example, movement data may be obtained, while in another example, area data may be obtained. Movement data of the vehicle system may include the location of the vehicle system, change in route of the vehicle system, change in speed of the vehicle system, stopping of the vehicle system, change in direction of the vehicle system, or the like. Area data includes all data related to the area that can be related to the vehicle system. Area data can include movement of another vehicle system, location of a container or cargo, location of other vehicle systems or cars, data related to one or more routes in the area, number of vehicles at a location in the area, or the like. In one example, a first sensor may rotate 45°, while a second sensor adjacent the first sensor may not rotate, but instead move laterally between a first position and a second position. In this manner, when the first sensor is rotated to one direction at 45° and the second sensor is in the first position, no overlap may occur. Meanwhile, when the first sensor is rotated in the same direction 45° and the second sensor is in the second position, an overlap of the field of views may be presented. To this end, when the first sensor is rotated in an opposite direction, and the second sensor is in the second position, no overlap may be presented. So, depending on the movement of each of the first sensor and second sensor, overlapping and non-overlapping field of view may be provided.

In another example, each sensor varies the position and/or field of view of that sensor in response to entry of vehicle system into an area to capture image data of the vehicle system while in the area. Specifically, based on the positioning of each sensor and being able to vary each field of view, an entire area may be monitored by a combination of the sensors. As a result, the sensor field of view of one sensor or of multiple sensors may include two or more routes. In this manner, the sensors may be utilized to determine a route taken by a vehicle system. For example, a field of view of a sensor may extend across or encompass two or more runways, two or more waterways, two or more tracks, two or more roads, two or more paths, etc. such that the sensor can detect the route on which the vehicle system is located, and when a vehicle changes a route. In one example, a rail vehicle may change tracks when in a depot.

The sensors can be coupled (e.g., by wired and/or wireless connections) to a controller 220 that receives movement data, area data, etc., related to the vehicle system from one or more (or all) of the sensors. The movement data and/or area data may be received as part of an image captured by a sensor, a video feed captured by a sensor, etc. Specifically, the sensors communicate data related to vehicle systems in the area being monitored. The controller is also configured to receive location data such as geographic coordinates from a vehicle controller 222 or GNSS receiver onboard the vehicle, so that the controller can make determinations related to the movement of vehicle systems that may or may not be in a field of view of each sensor. Based on the determination of movement of the vehicle systems, the controller may then determine the movement of each of the sensors to increase the amount of movement data that is obtained by each sensor. The controller in one example is a yard controller located within the area and remote from a vehicle system. The yard controller may be operated by a custodian of the yard to facilitate operation of the yard. Alternatively, the controller may be remote from the yard, such as a positive vehicle controller (PVC), back office controller, or the like, that is located at a remote location, such as a dispatch. Still, the controller may be utilized to improve efficiencies in the area based on recorded and communicated movement data provided by the sensors. For example, in an embodiment when the controller is a dispatch controller, movement data may indicate that a vehicle system that was scheduled for maintenance in the area has arrived one hour later than expected. At the stop, in addition to maintenance, the vehicle system is scheduled to switch out cars for hauling cargo. An operator at the controller at the dispatch may then request to know the expected wait time for maintenance and changing of vehicle system cars in the area. Based on the request, sensors located at a maintenance area may detect area data related to the number of vehicles lined up for maintenance, while sensors located at the car changing area may detect area data related to the number of vehicles lined up for car changing. Based on historical data related to the amount of time it takes to provide maintenance to the number of vehicle systems lined up, and the amount of time it takes to change cars based on the number of vehicles lined up, estimates for each may be provided. As such, the operator of the controller may determine that the scheduled maintenance should be skipped, to save time during the stop and get back on schedule because car changing can be quickly done and maintenance cannot.

Figure 3:
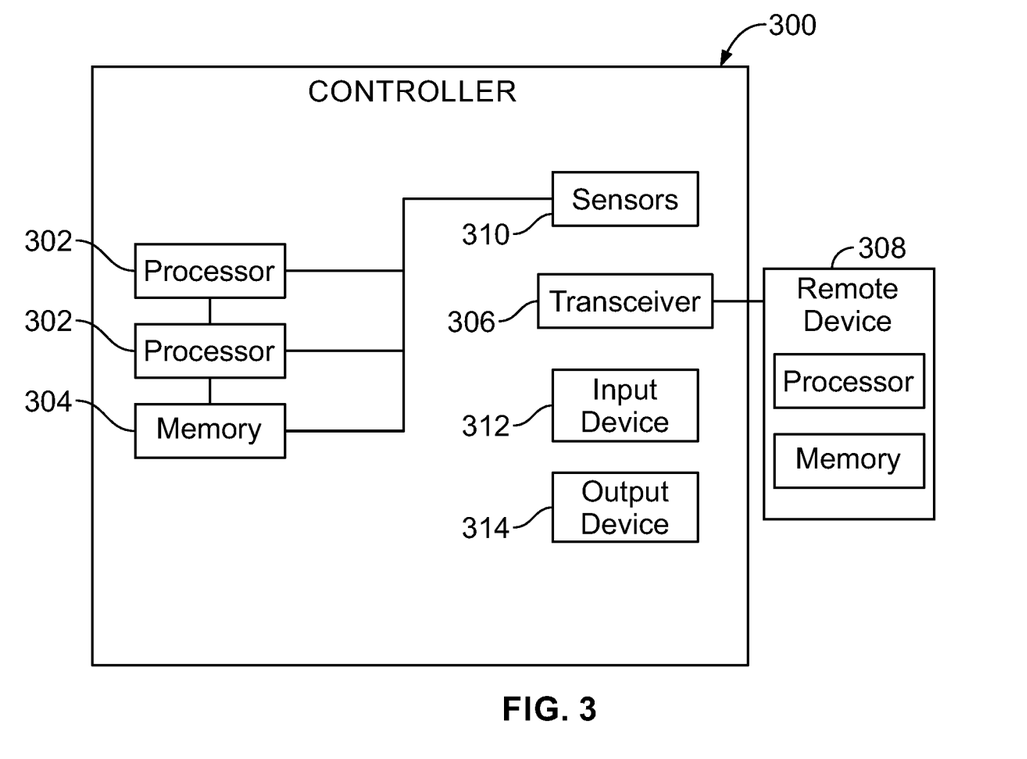
FIG. 3 illustrates block schematic diagram of a controller.

FIG. 3 provides a schematic illustration of a controller 300 that may be configured to determine movement changes for vehicle systems. In one example, the controller represents the controller in FIG. 2. As such, the controller may be a yard controller, area controller, remote controller, etc.

The controller may be a device that includes one or more processors 302 (microprocessors, integrated circuits, field programmable gate arrays, etc.). The one or more processors may receive location data from a vehicle controller, movement data from one or more sensors, area data from one or more sensors, vehicle characteristics from the vehicle controller and remote controllers, route characteristics from the vehicle controller and remote controllers, trip plans from a vehicle controller and remote controllers, etc. Based on receiving data related to the vehicle system, and in addition, to receiving data related to other vehicle systems that travel within the defined space, the one or more processors make determinations related to the movement of vehicle systems within the defined space.

The controller optionally may also include a controller memory 304, which may be an electronic, computer-readable storage device or medium. The controller memory may be within the housing of the controller, or alternatively may be on a separate device that may be communicatively coupled to the controller and the one or more processors therein. By "communicatively coupled," it is meant that two devices, systems, subsystems, assemblies, modules, components, and the like, are joined by one or more wired or wireless communication links, such as by one or more conductive (e.g., copper) wires, cables, or buses; wireless networks; fiber optic cables, and the like. The controller memory can include a tangible, non-transitory computer-readable storage medium that stores data on a temporary or permanent basis for use by the one or more processors. The memory may include one or more volatile and/or non-volatile memory devices, such as random access memory (RAM), static random access memory (SRAM), dynamic RAM (DRAM), another type of RAM, read only memory (ROM), flash memory, magnetic storage devices (e.g., hard discs, floppy discs, or magnetic tapes), optical discs, and the like. The memory may be utilized to store information related to location data, movement data, historical data, route data, vehicle data etc. The memory may then be used by the one or more processors to access such data for making determinations related to the movement of a vehicle system. In one example, data is logged into a document related to a vehicle system. In another example, data, such as a video feed, may be recorded and stored in the memory for later analysis. In addition, algorithms, applications, models, or the like may also be stored within the memory to be used by the one or more processors in making determinations related to the movement of vehicle systems within the area.

The controller may also include a transceiver 306 configured to communicate with a remote device 308. The transceiver may be a single unit or be a separate receiver and transmitter. In one example, the transceiver may only transmit signals, but alternatively may send (e.g., transmit and/or broadcast) and receive signals. The remote device may be a dispatch controller, a controller of another vehicle, a second controller coupled to the vehicle system, a controller within a wayside device, or the like. In one example, the remote device is a PVC system, and more specifically, in one embodiment a positive train control (PTC) system. The PVC system may be configured to receive speed information from the transceiver, determine and/or calculate the speed of the vehicle system, restrict movement of one or more vehicle systems based on a set of rules, etc. in another example, the remote device may be a vehicle controller that may communicate location data, vehicle data, route data, or the like to the controller.

The controller may also include one or more sensors 310 disposed within and adjacent the area to detect movement data, area data, vehicle data, route data, etc. In one example, each sensor has a determined sensor field of view such that all of the area may be detected by the sensors. In one embodiment, at least one sensor is a camera used to detect the presence and movement of a vehicle system. Adjacent as used herein is next such that a field of view of an area may be obtained. So, any position that allows an area, route, other vehicle, etc. to be within the field of view of a sensor is adjacent to that area, route, other vehicle, etc. even when not on or within that area, route, other vehicle, or the like.

The controller may also include an input device 312 and an output device 314. Specifically, the input device may be an interface between an operator and the one or more processors. The input device may include a display or touch screen, input buttons, ports for receiving memory devices, etc. In this manner, an operator may manually provide parameters into the controller, including vehicle parameters, route parameters, and trip parameters. Similarly, the output device may present information and data to an operator, or provide prompts for information and data. The output device may similarly be a display or touch screen. In this manner, a display or touch screen may be an input device and an output device.

The controller can additionally include a vehicle movement regulation unit 316. The vehicle regulation unit may be utilized to determine the movement of a vehicle system while the vehicle system is within the area. Specifically, the vehicle regulation unit receives data related to each vehicle within the area, and previous vehicles within the area. Based on characteristics related to the vehicle systems within the area, and vehicle systems previously in the area, determinations related to the movement of a vehicle system are made.

Figure 4:
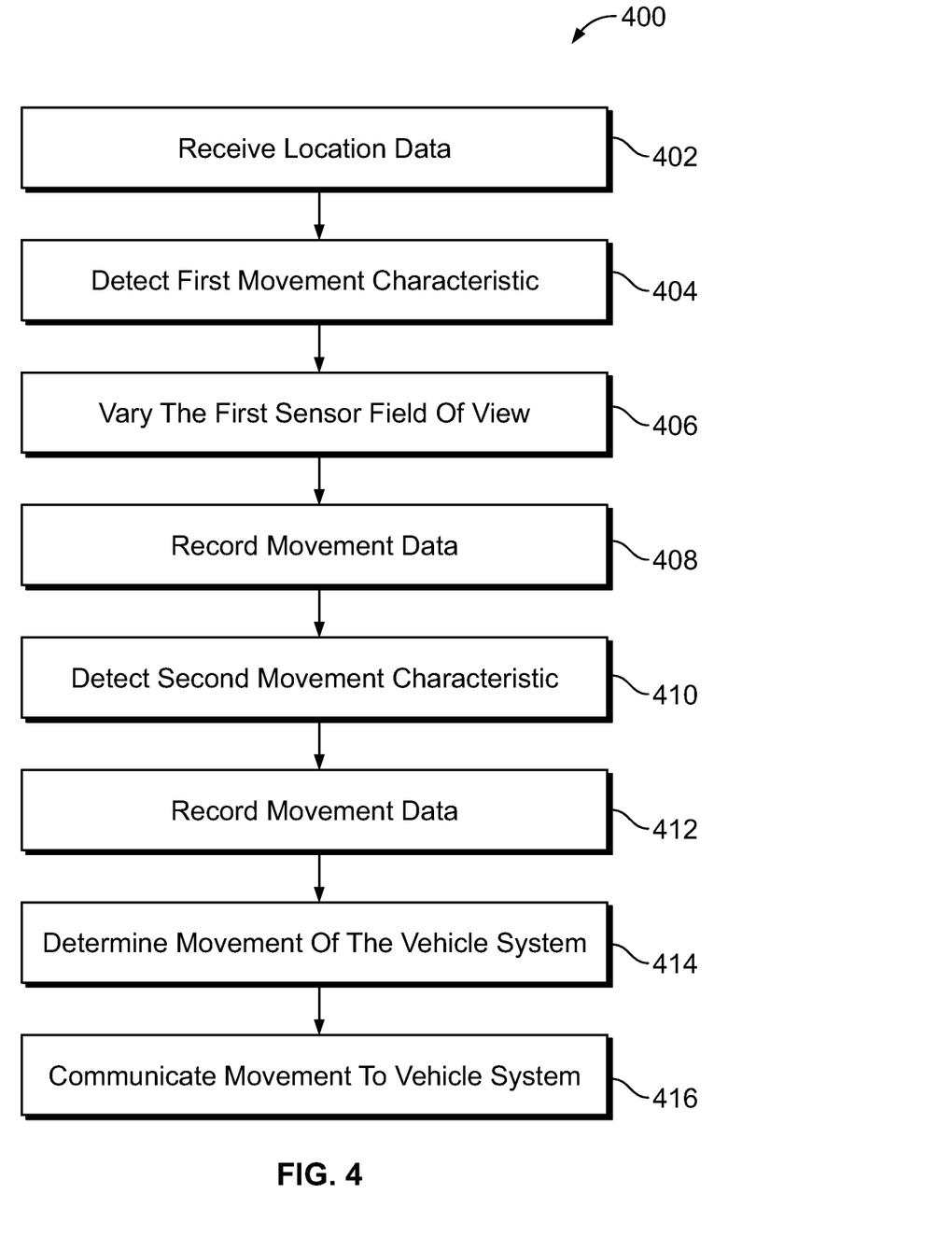
FIG. 4 illustrates a block schematic diagram of a method of controlling movement of a vehicle system in an area.

FIG. 4 illustrates a block diagram of a method 400 of controlling movement of a vehicle system in an area. In one example, the control system of FIG. 2 and the controller of FIG. 3 are utilized to implement the method.

At 402, a transceiver of a controller receives location data related to the vehicle system. In one embodiment, the communication may be related to entry of the vehicle system into an area. In one example, the transceiver communicates with a vehicle controller of a vehicle approaching an area. In another example, the transceiver communicates with a remote device such as a dispatch controller, back office controller, or the like of a vehicle system approaching an area. In yet another example, geographic coordinates of the vehicle system are communicated to the controller from a GNSS receiver onboard the vehicle.

At 404, a first movement characteristic of a vehicle system on a first route is detected within a first sensor field of view by a first sensor in response to entry of vehicle system into the area. The first movement characteristic may be a location of the vehicle system, presence on a route, movement direction, movement speed, movement variance, or the like. In one example, the first sensor is a camera that records image data. Specifically, in response to obtaining the communication related to the location data of an incoming vehicle system, the first sensor varies the first sensor field of view to capture the vehicle system as the vehicle system enters the area. In one example, the sensor does not operate until after obtaining the location data. In this manner, battery life of the sensor is extended. In particular, a controller may determine an estimated time in which the vehicle system will be within the first sensor field of view such that the first sensor starts operating in time to vary the field of view to capture the vehicle system as the vehicle system enters the area. In another example, the sensor is continuously operational, and merely varies the first sensor field of view. The first sensor field of view may be varied by moving the sensor from a first position to a second position, rotating the first sensor, zooming in or out, etc.

At 406, the first sensor field of view of the first sensor is varied based on the first movement characteristic detected. In one example, the first sensor rotates as a vehicle system is driving by to follow the vehicle system and capture movement data. In another example, the first sensor zooms out to detect one or more routes to capture movement data of the vehicle system switching routes. In each instance, based on the first movement characteristic detected, one or more processors make determinations related to where the vehicle system is moving to increase the amount of movement data captured by the sensor. In one example, two or more vehicle systems may be in the first sensor field of view. In such an example, the one or more processors may vary movement based on determined prioritizations. For example, the first sensor may vary movement based on the most recent vehicle system to enter the first sensor field of view. Alternatively, variance in the movement of the first sensor may be based on the type of cargo, or if a vehicle system has passengers. In other example, the first sensor may vary movement based on a vehicle system that needs maintenance. In another example, a determination is made to capture as much movement data and/or area data as possible of all vehicle systems in the first sensor field of view. In yet another example, if a second sensor field of view overlaps with a first sensor field of view, such overlap may be taken into consideration such that the first sensor and second sensor operate together to increase the movement data and/or area data obtained by the system.

At 408, movement data and/or area data related to the vehicle system obtained from the first sensor is recorded in a storage device. In one example, the movement data and/or area data is logged into a document, form, or the like. In another example, a series of photos is recorded. Similarly, a video segment may also be recorded. In addition, determinations made by one or more processor regarding the movement of the vehicle system may also be recorded as vehicle data. In this manner, a database is formed of the movement data of all vehicle systems movement in the area. This movement data may then be utilized as historical data when making determinations regarding the movement of the sensors of the system, determinations regarding suggested movements of the vehicle systems in the area, or the like.

At 410, a second movement characteristic of the vehicle system is detected within a second sensor field of view of a second sensor. Similar to the first sensor, the second sensor may rotate as a vehicle system is driving by to follow the vehicle system and capture movement data, and/or area data. In other examples, the second sensor may zoom in or out to detect one or more routes to capture movement data of the vehicle system switching routes. Based on the second movement characteristic detected, one or more processors make determinations related to where the vehicle system is going to move to increase the amount of movement data captured by the sensor. While referred to as a second movement characteristic, the second movement characteristic may be the same as the first movement characteristic, just obtained by the second sensor instead of the first sensor. For example, the first sensor may provide a first movement characteristic related to the location of a vehicle system, and the second sensor may provide a second movement characteristic that is also related to the location of the vehicle system. Additionally, as with the first sensor, two or more vehicle systems may be in the second sensor field of view. The second sensor field of view may overlap with the first sensor field of view, or be separate from the first sensor field of view. Still, one or more processors determine when to vary the movement of the second sensor based on the second sensor field of view and the movement data obtained in that second sensor field of view, including the second movement characteristic. The determination may optionally, also include movement data obtained within the first sensor field of view.

At 412, movement data and/or area data related to the vehicle system obtained from the second sensor is recorded in a storage device. In one example, the movement data is logged into a document, form, or the like. In another example, a series of photos is recorded. Similarly, a video segment may also be recorded. In addition, determinations made by one or more processor regarding the movement of the vehicle system also may be recorded as vehicle data. In this manner, a database is formed of the movement data of all vehicle systems movement in the area. This movement data may then be utilized as historical data when making determinations regarding the movement of the sensors of the system, determinations regarding suggested movements of the vehicle systems in the area, or the like.

At 414, movement of the vehicle system based on movement data and/or area data is determined. In particular, movement of the vehicle system may be based on the first movement characteristic, second movement characteristic, historical movement characteristics of the vehicle system or other vehicle systems, cargo locations, etc. While in this example, only two sensors are provided, in other examples, numerous more sensors may be provided. The historical movement data may include movement data recorded within a controller. Alternatively, the movement data may be received from a remote device such as a PTC controller, back office controller, or the like. The remote device may communicate such historical movement data, including movement characteristics, to the controller to determine movements of a vehicle system. This allows historical information to be used that is gathered from other areas to make determinations. Based on all of the movement characteristics obtained, a determination may be made how to best move the vehicle system through the rest of the area. Route suggestions, maintenance suggestions, cargo or passenger loading suggestions, etc. may be determined based on such information. Such suggestions improve efficiencies of individual vehicle systems while traveling through the area. Such determinations may be made utilizing an algorithm, mathematical function, mathematical model, look up table, decision tree, artificial intelligence algorithm, or the like. By utilizing movement data, including historical movement data, determination may be made to reduce time spent by the vehicle systems in the area, increasing efficiencies.

At 416, a movement determined is communicated to the vehicle system. In particular, a suggested route, maintenance time, loading time, route choice, etc. may be communicated to a vehicle controller. The vehicle controller may then provide an output, such as on a controller screen providing such information for use by an operator. In one example, the vehicle may be automated, resulting in the vehicle system automatically applying the suggested movement communicated. Still, by communicating to an operator, the operator may make a well informed decision to move through the area in an expeditious manner. Additionally, the operator may optionally provide additional input information such as a rescheduling of a delivery, addition of cargo, skipping or rescheduling of maintenance, etc. that may be utilized by the controller to redetermine the movement accordingly. In this manner, movement of each vehicle system is based on as much information as can be gathered, increasing speed through the area.

In one or more embodiments, a control system is provided that may include a first sensor configured to detect a vehicle system. The control system may also include one or more processors in communication with the first sensor. The one or more processors may be configured to receive communication related to entry of the vehicle system into an area, and operate the first sensor to begin monitoring the vehicle system in response to entry of vehicle system into the area.

The one or more processors may also be configured to record movement data related to the vehicle system, and determine movement of the vehicle system within the area based on the movement data.

Optionally, the first sensor may have a first sensor field of view, and the one or more processors are also configured to vary the first sensor field of view based on one of entry of the vehicle system into the area, or the movement data. In one aspect, the one or more processors may also be configured to vary the first sensor field of view by moving the first sensor from a first position to a second position. In another aspect, the control system also includes a second sensor configured to detect the vehicle system and having a second sensor field of view that is different than the first sensor field of view. In one example, the one or more processors may also be configured to vary the second sensor field of view based on one of entry of the vehicle system into the area or the movement data.

Optionally, the first sensor may be a static sensor. In one aspect, the one or more processors may also be configured to monitor two or more routes within the area, and wherein the movement data is related to the two or more routes. In another aspect, the first sensor may be a camera. In one example, the communication related to the location data of the vehicle system may be received from a global navigation satellite system receiver of the vehicle system. In one embodiment, the first sensor may be positioned adjacent to a route of the vehicle system. In another embodiment, the one or more processors may also be configured to communicate the movement data related to the vehicle system to a remote device.

In one or more embodiments, a method is provided that may include receiving, at a transceiver, location data related to a vehicle system into an area. The method may also include detecting, within a first sensor field of view of a first sensor, a first movement characteristic of the vehicle system on a first route in response to receiving the location data. The method may also include varying the first sensor field of view of the first sensor based on the first movement characteristic detected, and recording, in a storage device, movement data related to the vehicle system obtained from the first sensor.

Optionally, the method may also include determining, with one or more processors, movement of the vehicle system within the area based on the movement data. The method may also include communicating the movement determined to the vehicle system. In one aspect, the method may also include detecting, within a second sensor field of view of a second sensor, a second movement characteristic of the vehicle system on the first route. In another aspect, the method may also include varying the second sensor field of view based on the first sensor field of view and the first movement characteristic. In one example, the first movement characteristic may be one of presence on a route, movement direction, movement speed, or movement variance. In another example, the method may also include communicating the movement data recorded to a remote device.

In one or more embodiments, a control system is provided and may include a camera configured to detect a vehicle system and two or more routes, and a controller including one or more processors in communication with the camera. The one or more processors may be configured to receive communication related to location data of the vehicle system, and operate the camera to begin monitoring at least one of the vehicle system or the two or more routes in response to receiving the communication related to the location data of the vehicle system. The one or more processors may also be configured to log data related to the vehicle system or the two or more routes, and communicate the data logged related to the vehicle system and the two or more routes.

Optionally, to communicate the data logged, the one or more processors may also be configured to display the data logged on an output of the controller or sending the data logged to a remote device. In one aspect the controller may be a depot controller.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A control system comprising:
   a first sensor configured to detect a vehicle system;
   one or more processors in communication with the first sensor and configured to:
      receive communication related to entry of the vehicle system into an area;
      operate the first sensor to begin monitoring the vehicle system in response to entry of the vehicle system into the area;
      record movement data related to the vehicle system; and
      determine future movement of the vehicle system within the area based on the movement data; and
      wherein the first sensor has a first sensor field of view, and the one or more processors are also configured to vary the first sensor field of view based on the movement data, movement data of a second vehicle system, and the future movement of the vehicle system, wherein the second vehicle system is different from the vehicle system, and wherein the vehicle system and the second vehicle system are within the first sensor field of view.

2. The control system of claim 1, wherein the one or more processors are also configured to vary the first sensor field of view by moving the first sensor from a first position to a second position.

3. The control system of claim 1, further comprising a second sensor configured to detect the vehicle system and having a second sensor field of view that is different than the first sensor field of view.

4. The control system of claim 3, wherein the one or more processors are also configured to vary the second sensor field of view based on one of entry of the vehicle system into the area or the movement data.

5. The control system of claim 1, wherein the one or more processors also are configured to monitor two or more routes within the area, and wherein the movement data is related to the two or more routes.

6. The control system of claim 1, wherein the communication related to location data of the vehicle system is received from a global navigation satellite system receiver of the vehicle system.

7. The control system of claim 1, wherein the first sensor is positioned adjacent to a route of the vehicle system.

8. The control system of claim 1, wherein the one or more processors are also configured to communicate the movement data related to the vehicle system to a remote device.

9. A method comprising:
   receiving, at a transceiver, location data related to a vehicle system into an area;
   detecting, within a first sensor field of view of a first sensor, a first movement characteristic of the vehicle system on a first route in response to receiving the location data;
   determining, with one or more processors, future movement of the vehicle system within the area based on the first movement characteristic and the future movement of the vehicle system;
   varying the first sensor field of view of the first sensor based on the first movement characteristic detected, movement data of a second vehicle system, and the future movement of the vehicle system, wherein the second vehicle system is different from the vehicle system, and wherein the vehicle system and the second vehicle system are within the first sensor field of view; and recording, in a storage device, movement data related to the vehicle system obtained from the first sensor.

10. The method of claim 9, further comprising:
determining, with one or more processors, movement of the vehicle system within the area based on the movement data; and
communicating the movement determined to the vehicle system.

11. The method of claim 9, further comprising: detecting, within a second sensor field of view of a second sensor, a second movement characteristic of the vehicle system on the first route.

12. The method of claim 11, further comprising: varying the second sensor field of view based on the first sensor field of view and the first movement characteristic.

13. The method of claim 9, wherein the first movement characteristic is one of presence on a route, movement direction, movement speed, or movement variance.

14. The method of claim 9, further comprising: communicating the movement data recorded to a remote device.

15. A control system comprising:
a camera configured to detect a vehicle system and an area;
a controller including one or more processors in communication with the camera and configured to:
receive communication related to location data of the vehicle system;
operate the camera to begin obtaining at least one of movement data related to the vehicle system or area data related to the area in response to receiving the communication related to the location data of the vehicle system;
log the at least one of the movement data or the area data; and
communicate the at least one of the movement data or the area data logged related to the vehicle system and two or more routes;
determine future movement of the vehicle system within the area based on the movement data; and
vary a first sensor field of view of a first sensor based on the movement data detected, movement data of a second vehicle system, and the future movement of the vehicle system, wherein the second vehicle system is different from the vehicle system, and wherein the vehicle system and the second vehicle system are within the first sensor field of view.

16. The control system of claim 15, wherein to communicate the at least one of the movement data or the area data logged, the one or more processors are configured to display the at least one of the movement data or the area data logged on an output of the controller or sending the data logged to a remote device.

17. The control system of claim 15, wherein the controller is a depot controller.

18. A control system comprising:
a first sensor configured to detect a vehicle system;
one or more processors in communication with the first sensor and configured to:
receive communication related to entry of the vehicle system into an area;
operate the first sensor to begin monitoring the vehicle system in response to entry of the vehicle system into the area;
record movement data related to the vehicle system;
determine future movement of the vehicle system within the area based on the movement data; and
wherein the first sensor has a first sensor field of view, and the one or more processors are also configured to:
vary the first sensor field of view based on the movement data, movement data of a second vehicle system, and the future movement of the vehicle system, wherein the second vehicle system is different from the vehicle system; and
vary the first sensor field of view based on prioritization of the vehicle system, wherein the prioritization is based on at least one of time of entry to the area, maintenance requirements, data requirements, or preventing an overlap of the field of view between the first sensor and a second sensor.

19. A method comprising:
receiving, at a transceiver, location data related to a vehicle system into an area;
detecting, within a first sensor field of view of a first sensor, a first movement characteristic of the vehicle system on a first route in response to receiving the location data;
determining, with one or more processors, future movement of the vehicle system within the area based on the first movement characteristic and the future movement of the vehicle system;
varying the first sensor field of view of the first sensor based on the first movement characteristic detected, movement data of a second vehicle system, and the future movement of the vehicle system, wherein the second vehicle system is different from the vehicle system;
varying the first sensor field of view is based on prioritization of the vehicle system, wherein the prioritization is based on at least one of time of entry to the area, maintenance requirements, data requirements, or preventing an overlap of the field of view between the first sensor and a second sensor; and
recording, in a storage device, movement data related to the vehicle system obtained from the first sensor.

20. A control system comprising:
a camera configured to detect a vehicle system and an area;
a controller including one or more processors in communication with the camera and configured to:
receive communication related to location data of the vehicle system;
operate the camera to begin obtaining at least one of movement data related to the vehicle system or area data related to the area in response to receiving the communication related to the location data of the vehicle system;
log the at least one of the movement data or the area data;
communicate the at least one of the movement data or the area data logged related to the vehicle system and two or more routes;
determine future movement of the vehicle system within the area based on the movement data;
vary a first sensor field of view of a first sensor based on the movement data detected, movement data of a second vehicle system, and the future movement of the vehicle system, wherein the second vehicle system is different from the vehicle system; and
vary the first sensor field of view based on prioritization of the vehicle system, wherein the prioritization is based on at least one of time of entry to the area, maintenance requirements, data requirements, and or preventing an overlap of the field of view between the first sensor and a second sensor.

* * * * *